(12) United States Patent
Küke

(10) Patent No.: US 6,428,696 B2
(45) Date of Patent: *Aug. 6, 2002

(54) PROCESS FOR PREPARING A CHLORINE-DIOXIDE-CONTAINING DISINFECTANT SOLUTION FOR WATER TREATMENT

(76) Inventor: Fritz Küke, Haselnussweg 27, 30629 Hannover (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/757,240

(22) Filed: Jan. 9, 2001

Related U.S. Application Data

(63) Continuation of application No. 08/945,635, filed on Oct. 24, 1997, now Pat. No. 6,171,485.

(30) Foreign Application Priority Data

Apr. 25, 1995 (DE) .......................................... 195 14 612

(51) Int. Cl.$^7$ .............................. C01B 11/02; C02F 1/76
(52) U.S. Cl. .................... 210/192; 423/477; 210/758
(58) Field of Search ................................. 423/477, 478; 210/192, 758, 759

(56) References Cited

U.S. PATENT DOCUMENTS

| | | | |
|---|---|---|---|
| 2,323,593 A | 7/1943 | Hampel et al. | 423/477 |
| 2,323,594 A | 7/1943 | Hampel | 423/477 |
| 4,104,190 A | 8/1978 | Hartshorn | 423/477 |
| 5,008,096 A | 4/1991 | Ringo | 423/477 |
| 5,380,518 A | 1/1995 | Roozdar | 423/477 |
| 5,435,984 A | 7/1995 | Daly et al. | 423/477 |
| 6,077,495 A * | 6/2000 | Speronello et al. | 423/477 |
| 2001/0005499 A1 * | 6/2001 | Ostgard | 423/477 |

FOREIGN PATENT DOCUMENTS

| | | | |
|---|---|---|---|
| AT | 255339 | 6/1967 | |
| AT | 341 125 | 1/1978 | |
| CA | 470725 | 1/1951 | |
| DE | 843 999 | 7/1952 | |
| DE | 2730883 * | 9/1979 | 423/477 |
| JP | 07-088201 * | 9/1995 | 423/477 |

OTHER PUBLICATIONS

"Herstellung von reinem Chlordioxid im Laboratorium", Umwelt und Degussa, Produkte, Verfahren, Methoden #2.3 (No date).

Achte Vollig Neu Bearbeitete Auflage, "Gmelins Handbuch Der Anorganischen Chemie", Schwefel, Teilb—Lieferung 2, Mit 146 Figuren, System—Nummer 9, 1960, Verlag Chemie, GmbH (No month).

* cited by examiner

*Primary Examiner*—Ngoc-Yen Nguyen
(74) *Attorney, Agent, or Firm*—Pendorf & Cutliff

(57) ABSTRACT

The present process proceeds from an aqueous reaction solution containing a chlorite and a halogen-free oxidizing agent which is present in an excess of up to double the required stoichiometric amount. The pH of the reaction solution is set at between 5.5 and 9.5, preferably between 6 and 9, and the reaction solution is reacted at ambient temperature until almost all the chlorite has been converted into chlorine dioxide. In this way a chlorine dioxide-containing solution is obtained which is free not only from residual chlorite but also from chlorate and other undesirable by-products and can be used directly as such in water treatment. Preferably an aqueous chlorite solution with a pH or more than 9.5 and an aqueous solution of the oxidizing agent are mixed with one another in order to produce the reaction solution, the pH of the aqueous mixture being adjusted by means of a proton donor present in the oxidizing agent solution. In this way a two-component reaction product is advantageously obtained which need only be mixed in a pre-determined ratio in order to produce a fresh chlorate-free chlorine dioxide solution. It is further advantageous to add to the aqueous chlorite solution or aqueous oxidizing agent solution a buffer substance which forms a buffer system which is active between pH 5.5 and pH 9.5 in the aqueous mixture, thus further stabilizing the pH set. The preferred presence of at least catalytic amounts of silver ions or ions of other transition metals in the reaction solution has a positive effect on the conversion of chlorite ions into chlorine dioxide.

21 Claims, 1 Drawing Sheet

PROCESS FOR PREPARING A CHLORINE-DIOXIDE-CONTAINING DISINFECTANT SOLUTION FOR WATER TREATMENT

REFERENCE TO RELATED APPLICATIONS

This application is a continuation of application Ser. No. 08/945,635 filed Oct. 24, 1997, issued as U.S. Pat. No. 6,171,485 on Jan. 9, 2001.

BACKGROUND OF THE INVENTION

Field of the Invention

Aqueous solutions of chlorine dioxide, because of the high oxidation power of chlorine dioxide, are frequently used in water-treatment methods. The area of application ranges from the disinfection of drinking water and bathing water to treatment of service water and wastewater. In comparison with the classic oxidizing disinfectants chlorine and hypochlorite, chlorine dioxide is distinguished in use by an outstanding ecobalance. Thus, when chlorine dioxide is used, only small amounts of AOX ("adsorbable organic halogen compounds"; overall parameter for all chlorine, bromine and iodine compounds which can be adsorbed to activated carbon and have very different hazard potentials) and virtually no trihalomethane (THM, haloforms) are formed.

It is known, for example from DE-C 843 999, for the preparation of chlorine dioxide, to proceed from a chlorite, for example sodium chlorite and to oxidize this to chlorine dioxide with an oxidizing agent, for example sodium peroxodisulphate, in aqueous solution according to the summation equation

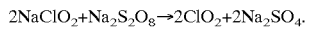

$$2NaClO_2 + Na_2S_2O_8 \rightarrow 2ClO_2 + 2Na_2SO_4.$$

To obtain a reaction rate as high as possible, the reaction solution in this known process is set to a pH of 5–9, if appropriate using a buffer, contains the oxidizing agent in a stoichiometric excess and can be heated to up to 65° C. for further acceleration of the reaction. The chlorine dioxide forming is continuously expelled from the reaction solution by passing in inert gas and is collected in an absorption tower.

Although this known process gives a chlorine dioxide of very high purity at good yields, based on the chlorite used, it is highly restricted in its applicability and is little suited to industrial application "on site", not only because of the high cost of equipment for separating the chlorine dioxide, but also because of the high explosion hazard of the gaseous chlorine dioxide. Furthermore, for many applications, for example for drinking-water treatment, there is also no possibility of avoiding the separation of the chlorine dioxide and using the reacted reaction solution as such for the disinfection, since this solution still contains too much residual chlorite and, moreover, is contaminated by toxic chlorate formed as by-product.

SUMMARY OF THE INVENTION

The object of the invention is to develop the known process in the manner of a "one pot" reaction in such a manner that the reacted chlorine-dioxide-containing reaction solution can be used directly as such for the disinfection and is directly suitable for drinking-water treatment, for example. This object is achieved according to the invention by means of the fact that an aqueous reaction solution is prepared from chlorite and halogen-free oxidizing agent, which reaction solution contains the oxidizing agent at up to twice the stoichiometrically required amount and is set to a pH between 5.5 and 9.5 and is reacted at room temperature until the chlorite is at least virtually completely converted to chlorine dioxide.

The invention is based on the finding that it is possible, by means of systematic reaction procedure, to react the reaction solution to give a chlorine-dioxide-containing product solution which virtually no longer contains residual chlorite (in the ideal case no chlorite at all) and is also free of chlorate and other unwanted by-products. Surprisingly, it has been found that this is achieved by the interaction of a plurality of factors, namely

- setting the pH of the solution to 5.5 to 9.5, preferably 6 to 9, as promptly as possible,
- oxidizing agent excess in a molar ratio of chlorite to oxidizing agent between 1 and 2, preferably between 1.75 and 2,
- sufficiently long reaction time at room temperature.

DETAILED DESCRIPTION OF THE INVENTION

Figure 1:
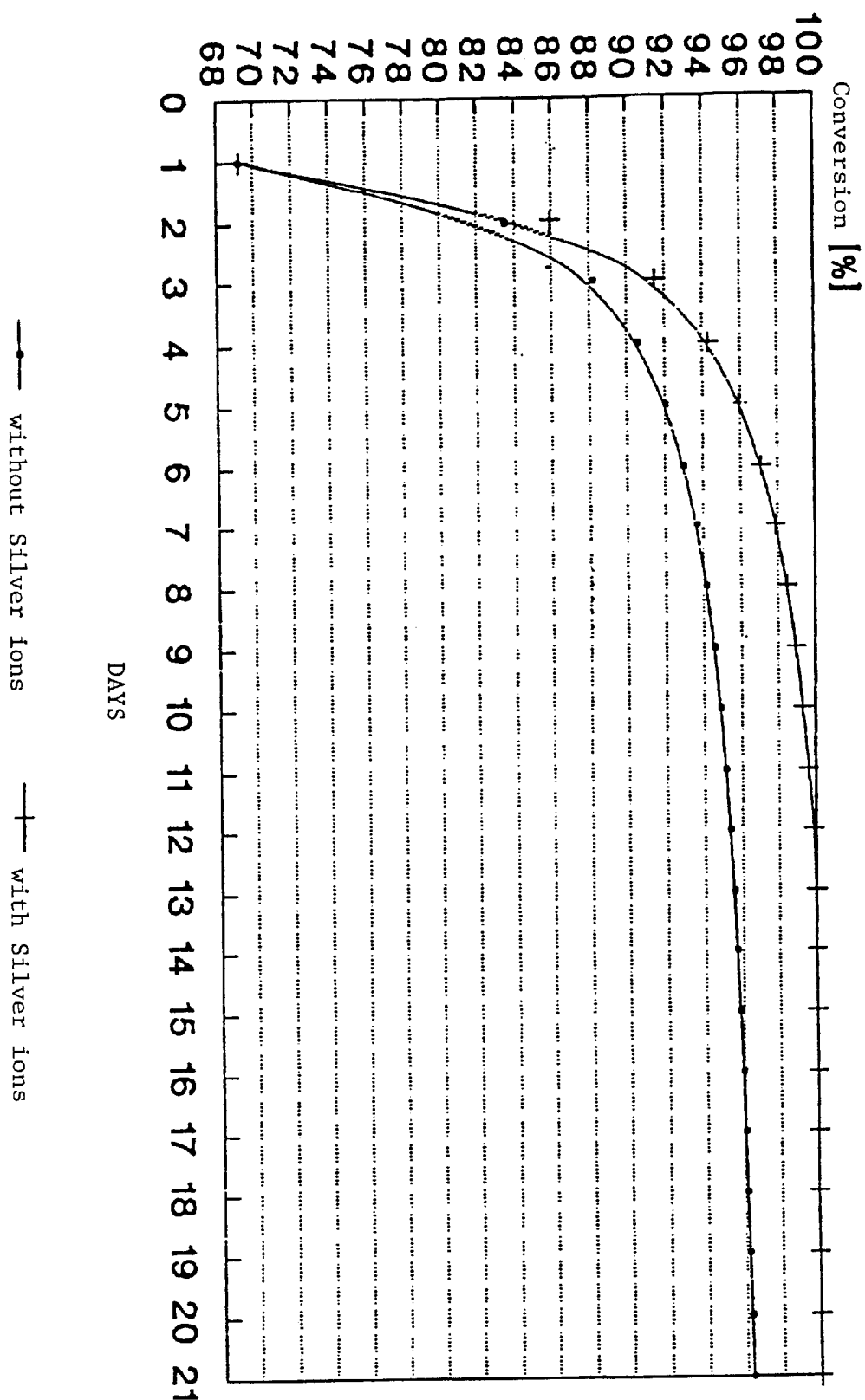
FIG. 1 shows the progress of the reaction according to Example 3.

Commercially conventional chlorite solutions, for reasons of storage stability, are made highly alkaline, meaning that the reaction solution has a pH of about 12 in the absence of additional measures (at least in a relatively long initial phase). At such a high pH, the chlorine dioxide formed unavoidably disproportionates into chlorite and chlorate. It has now been found that, at pHs below 9.5, the tendency of the chlorine dioxide to disproportionate disappears, but the stability of the chlorite solution is ensured sufficiently, at least for the duration of the oxidation reaction. Only at pHs below 5.5 is the chlorite solution no longer sufficiently stable. Thus, the reaction solution is brought as quickly as possible to a pH range in which both the starting material (chlorite) and the product (chlorine dioxide) are stable and the oxidation reaction can proceed without interfering side reactions (neither as decomposition of the starting material chlorite nor as decomposition of the product chlorine dioxide). Higher temperatures, which promote chlorate formation, are avoided and sufficient oxidizing agent is made available. Thus virtually no chlorate is formed in the reaction mixture and the chlorite used is converted virtually quantitatively into chlorine dioxide.

To prepare the aqueous reaction mixture, a chlorite solution is expediently mixed with a solution of the oxidizing agent, the rapid setting of the pH of this mixture, which is important for the success of the process, being achieved using a proton donor, expediently present in dissolved form, which decreases the pH of the mixture. This proton donor can be added to the two reactants during the mixing process, but, in a preferred embodiment of the invention, is present in the solution of the oxidizing agent. A particular advantage of the invention in this case is that a reaction package consisting of two components can be made available to a user and the user only needs to mix these components in a preset ratio in order to prepare in-house a fresh chlorate-free chlorine dioxide solution at any time as required. If appropriate, the oxidizing-agent- and the proton-donor-containing component can also be supplied in solid form and can be brought into solution by the user, which is advisable, in particular, if the solution of the oxidizing agent cannot be kept sufficiently storage-stable per se, and, moreover, which decreases the shipping costs. In principle, the chlorite solution can also be prepared in-house by the user by dissolving solid sodium chlorite (stabilized with sodium chloride), but this is less expedient, since solid sodium chlorite is subject to the provisions on transport of hazardous materials.

The concentration of the chlorite and, correspondingly, of the oxidizing agent, in the reaction solution has no effect on the course of the process. However, excessively high concentrations should be avoided, in order that an impermissibly high concentration of chlorine dioxide does not form in the reacted solution.

The preferred oxidizing agents are peroxodisulphates, but other halogen-free oxidizing agents, such as permanganates, Fentons reagent or ozone, can be used. The oxidizing agent shall be of a type and in sufficient amount in the aqueous reaction mixture for complete oxidation of the chlorite and be present in the stoichiometric excess. It will then not be used completely in the chlorine dioxide formation reaction. This can be expedient in many applications, in particular for the excess oxidizing agent to reoxidize in situ the chlorine dioxide which was reduced during the use of the chlorine dioxide solution e.g. by organic contaminants present in the treated water, which improves the overall action of the disinfectant or treatment solution. This is a particular additional advantage of the invention, which does not occur in the known process.

Compounds which can be used as proton donor for the purposes of the invention are all substances which are compatible with the oxidizing agent and with the chlorite and can decrease the pH of the reaction mixture by releasing acid protons. Typical examples are sodium hydrogen sulphate, sodium dihydrogen phosphate and acid salts such as iron(III) chloride or aluminium chloride.

In further pursuance of the inventive concept, it is expedient to add to the aqueous chlorite solution or the aqueous oxidizing agent solution a buffer substance which forms a buffer system active between pH 5.5 and 9.5 in the reaction mixture. This gives an additional stabilization of the set pH.

The term "buffer substance" is here taken to mean all compounds which can form the conjugated acid or base of an active buffer system by donating or accepting one or more protons, with the active buffer system no longer needing to include the buffer substance itself. The buffer substance has a basic reaction in the reaction mixture when it is introduced in the chlorite solution and has an acidic reaction when it is introduced in the solution of the oxidizing agent. An example of a buffer substance which is present in the chlorite solution and is highly suitable for the purposes of the invention is sodium carbonate, in which the anion ($CO_3^{2-}$), with the acceptance of one or two protons, forms hydrogen carbonate or carbonic acid, respectively, that is the conjugated base or acid of a hydrogen carbonate/carbonic acid buffer. An example of a buffer substance which can be added to the solution of the oxidizing agent is sodium dihydrogen phosphate, which forms a hydrogen phosphate/dihydrogen phosphate buffer in the reaction mixture. Other buffer systems are also suitable, provided that they form an active buffer system in the required pH range and are harmless in drinking water, for example.

A particularly rapid, and, above all, a completely quantitative conversion of chlorite to chlorine dioxide is surprisingly achieved if at least catalytic amounts of ions of a transition metal are introduced into the reaction solution, preferably in the form of silver salts, but also in the form of iron salts, manganese salts or (provided that they are compatible with the subsequent use of chlorine dioxide solution) copper salts. The reason for this action is not currently precisely understood; presumably these ions intervene directly in the redox reaction mechanism. In principle, they can be added to the reaction mechanism at any point in time, therefore, for example, they may also already be present in the aqueous chlorite solution or oxidizing agent solution. However, later addition of the ions is equally possible. Precipitation products (e.g. AgCl or the like) which may be formed in conjunction in the reaction or product mixture, which may become visible as turbidity, may be separated off in a conventional manner after a sufficient degree of conversion has been achieved.

The invention is described below with reference to illustrative examples.

EXAMPLE 1

Preparation of an aqueous chlorine-dioxide-containing solution 16.45 grams of a commercial aqueous sodium chlorite solution having a content of 300 grams of sodium chlorite per liter of solution (e.g. Degussa sodium chlorite 300 W) are diluted with water to 900 ml. 2 grams of sodium carbonate are added to this dilute sodium chlorite solution and dissolved therein. The resulting solution (starting material solution 1) has a pH of approximately 12.

5.33 grams of peroxodisulphate and 2.15 grams of sodium hydrogen sulphate are dissolved in 100 ml of water. The pH of the resulting solution (starting material solution 2) is approximately 2.

Starting material solution 2 is added to starting material solution 1 and mixed with this. In the course of one minute a pH of 7.5 is established. This pH is stabilized by the resulting sodium carbonate/carbonic acid buffer. Chlorine dioxide develops in the aqueous reaction mixture according to

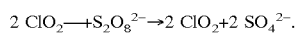

$$2\ ClO_2^- + S_2O_8^{2-} \rightarrow 2\ ClO_2 + 2\ SO_4^{2-}.$$

Since none of the starting materials of the given reaction equation is present in excess, approximately 12 hours are required for their complete conversion. After the reaction, approximately 3 grams of chlorine dioxide are present per liter of solution.

EXAMPLE 2

Preparation of an aqueous chlorine-dioxide-containing solution

The procedure is carried out as in Example 1, but, for the preparation of starting material solution 1, 5.04 g of a solid mixture containing 80% by weight of sodium chlorite and 20% by weight of sodium chloride are initially admixed with 2 g of sodium carbonate and then with water until the total volume is 900 ml. The solids mixture and the sodium carbonate dissolve in the water, a pH of approximately 12 being established in the resulting solution (starting material solution 1).

EXAMPLE 3

Catalytic acceleration of the reaction

For comparison, an aqueous chlorine-dioxide-containing solution was prepared, firstly in the absence (a) and secondly in the presence (b) of $Ag^+$ ions.

a) 2.81 g of $NaHSO_4$ and 9.5 g of $Na_2S_2O_8$ are dissolved in 100 ml of water, a pH of approximately 2 being established. The resulting solution is admixed with 900 ml of an alkaline solution (pH 12) which contains 3 g of $ClO_2^-$ and 2 g of $Na_2CO_3$. In a few seconds a pH between 7 and 8 is established in the reaction mixture.

After 12 days a degree of conversion of 95%, based on the chlorite, is achieved. For the course of the reaction see FIG. 1 below.

b) The procedure is carried out as under (a), but 35 mg of $AgNO_3$ are added immediately to the reaction mixture.

After 12 days the degree of conversion is 99.8%, based on the chlorite. For the course of the reaction see FIG. 1 below.

What is claimed is:

1. A process for production of a chlorine-dioxide containing disinfection solution immediately ready for treatment of water, said process comprising:
    producing an aqueous mixture containing a chlorite and a halogen-free oxidizing agent, wherein the oxidizing agent is present in an amount of between once and twice the stoichiometric amount necessary for oxidation of the chlorite to chlorine dioxide,
    adjusting the pH value of said aqueous mixture to between 5.5 and 9.5,
    reacting the chlorite with the oxidizing agent in said aqueous mixture to form a product solution containing chlorine dioxide without separation of said chlorine dioxide from said product solution, and
    continuing said reaction without separation of said chlorine dioxide from said product solution until said product solution is substantially free of chlorite and safe for direct addition in disinfecting effective amounts to water.

2. A process according to claim 1, wherein
    for production of the aqueous mixture an aqueous alkaline solution of the chlorite and an aqueous solution of said oxidizing agent are added to each other, and
    said aqueous solution of the oxidizing agent contains sufficient proton donor for adjustment of the pH value of the aqueous mixture to between 5.5 and 9.5.

3. A process according to claim 2, wherein the aqueous alkaline chlorite solution or the aqueous oxidizing agent solution includes a buffer substance, which forms in the aqueous mixture an effective buffer system at between pH 5.5 and 9.5.

4. A process according to claim 3, wherein the aqueous alkaline chlorite solution contains sodium carbonate as the buffer substance.

5. A process according to claim 3, wherein the aqueous oxidizing agent solution contains sodium dihydrogen phosphate as the buffer substance.

6. A process according to claim 1, wherein in the aqueous mixture the pH value is adjusted to between 6 and 9.

7. A process according to claim 1, wherein sodium peroxodisulfate is employed as the oxidizing agent and the molar relationship of chlorite to peroxodisulfate is between 1 and 2.

8. A process according to claim 7, wherein the molar relationship of chlorite to peroxodisulfate is between 1.75 and 2.

9. A process according to claim 1, wherein the ratio of chlorite molecules to the number of electrons accepted by the oxidizing agent is between 0.875 and 1.

10. A process according to claim 1, wherein the aqueous mixture contains a catalytically effective amount of ions of a transition metal.

11. A process according to claim 1, wherein said aqueous mixture contains a catalytically effective amount of ions of a transition metal, and wherein the conversion proceeds until 95% or more of the chlorite has been converted to chlorine dioxide.

12. A process as in claim 10, wherein said reaction is continued until the ratio (chlorine dioxide):(chlorite) is (95 or more):(5 or less).

13. A process as in claim 1, wherein said reaction product is essentially free of chlorate.

14. A process as in claim 1, wherein said reaction is carried out for at least 12 hours.

15. A process as in claim 1, wherein said reaction is carried out at room temperature.

16. A process for water treatment including the following steps:
    producing an aqueous mixture containing a chlorite and a halogen-free oxidizing agent, wherein the oxidizing agent is present in an amount of between once and twice the stoichiometric amount necessary for oxidation of the chlorite to chlorine dioxide,
    adjusting the pH value to between 5.5 and 9.5 in said aqueous mixture,
    reacting said chlorite with said oxidizing agent to form a product solution containing chlorine dioxide, without separating said chlorine dioxide from said product solution, until said product solution is substantially free of chlorite and safe for direct addition in disinfecting effective amounts to water, and
    adding disinfecting effective amounts of said product solution directly to water to be treated.

17. A process as in claim 16, wherein said water to be treated is selected from the group consisting of drinking water, bath water, industrial water and waste water.

18. A process according to claim 16, wherein said aqueous mixture contains a catalytically effective amount of ions of a transition metal.

19. A process for the production of a chlorine-dioxide containing disinfection solution substantially free of chlorite and chlorate and safe for direct addition in disinfecting effective amounts to water for human consumption, said process comprising:
    (a) providing an aqueous mixture containing chlorite and halogen-free oxidizing agent, wherein the oxidizing agent is present in an amount of between once and twice the stoichiometric amount necessary for oxidation of the chlorite to chlorine dioxide,
    (b) adjusting the pH value of the aqueous mixture to between 5.5 and 9.5, and
    (c) reacting said chlorite with said oxidizing agent to form a product solution containing chlorine dioxide, without separation of the resulting chlorine dioxide from said product solution, until the chlorite is substantially completely converted and approximately 3 grams of chlorine dioxide is in solution per liter of the aqueous mixture, said product solution being substantially free of chlorite and chlorate and safe for direct addition in disinfecting effective amounts to water for human consumption.

20. A process for production of a chlorine-dioxide containing disinfection solution immediately ready for treatment of water, said processing comprising:
    producing an aqueous mixture containing a chlorite, a halogen-free oxidizing agent, and a catalytically effective amount of ions of a transition metal, wherein the oxidizing agent is present in an amount of between once and twice the stoichiometric amount necessary for oxidation of the chlorite to chlorine dioxide, adjusting the pH value to between 5.5 and 9.5 in said aqueous mixture, and reacting said aqueous mixture to form an aqueous mixture containing chlorine dioxide without separation of said chlorine dioxide from said aqueous mixture, and continuing said reaction without separation of said chlorine dioxide from said aqueous mixture until said aqueous mixture is substantially free of chlorite and safe for direct addition in disinfecting effective amounts to water.

21. A process for production of a chlorine-dioxide containing disinfection solution immediately ready for treatment of water, said process comprising:

producing an aqueous mixture containing a chlorite and a halogen-free oxidizing agent, wherein the oxidizing agent is present in an amount of between once and twice the stoichiometric amount necessary for oxidation of the chlorite to chlorine dioxide, rapidly adjusting the pH value of said aqueous mixture to between 5.5 and 9.5, reacting the chlorite with the oxidizing agent in said aqueous mixture at room temperature to form a product solution containing chlorine dioxide without separation of said chlorine dioxide from said product solution, and continuing said reaction without separation of said chlorine dioxide from said product solution until said product solution is substantially free of chlorite and safe for direct addition in disinfecting effective amounts to water.

* * * * *